United States Patent
Jung et al.

(10) Patent No.: US 9,990,413 B2
(45) Date of Patent: Jun. 5, 2018

(54) METHOD AND DEVICE FOR GENERATING MUSIC PLAYLIST

(71) Applicant: Hyundai Motor Company, Seoul (KR)

(72) Inventors: Woochul Jung, Seoul (KR); Young Woo Choi, Incheon (KR)

(73) Assignee: Hyundai Motor Company, Seoul (KR)

( * ) Notice: Subject to any disclaimer, the term of this patent is extended or adjusted under 35 U.S.C. 154(b) by 443 days.

(21) Appl. No.: 14/721,567

(22) Filed: May 26, 2015

(65) Prior Publication Data

US 2016/0162565 A1   Jun. 9, 2016

(30) Foreign Application Priority Data

Dec. 9, 2014   (KR) .......................... 10-2014-0175826

(51) Int. Cl.
  *G06F 7/00* (2006.01)
  *G06F 17/30* (2006.01)

(52) U.S. Cl.
  CPC .. *G06F 17/30598* (2013.01); *G06F 17/30772* (2013.01)

(58) Field of Classification Search
  CPC ......... G06F 17/30772; G06F 17/30749; G06F 17/30598; G06F 17/3074
  See application file for complete search history.

(56) References Cited

U.S. PATENT DOCUMENTS

| | | | |
|---|---|---|---|
| 6,539,395 B1 * | 3/2003 | Gjerdingen | G06F 17/30743 |
| 6,748,395 B1 * | 6/2004 | Picker | G06Q 30/0209 |
| 7,340,455 B2 * | 3/2008 | Platt | G06F 17/30749 |
| 8,583,665 B2 * | 11/2013 | Maekawa | G06F 17/30017 707/754 |
| 8,642,872 B2 | 2/2014 | Lu et al. | |
| 8,966,394 B2 * | 2/2015 | Gates | G06F 17/30053 715/733 |
| 2008/0022844 A1 * | 1/2008 | Poliner | G10H 1/0041 84/609 |
| 2008/0177773 A1 * | 7/2008 | Boss | G06Q 30/02 |
| 2008/0188964 A1 * | 8/2008 | Bech | G06F 17/30743 700/94 |
| 2009/0063414 A1 * | 3/2009 | White | G06F 17/30017 |

(Continued)

FOREIGN PATENT DOCUMENTS

JP   2008-204193 A   9/2008
KR   10-2006-0091063 A   8/2006

(Continued)

*Primary Examiner* — Hasanul Mobin
(74) *Attorney, Agent, or Firm* — Mintz Levin Cohn Ferris Glovsky and Popeo, P.C.; Peter F. Corless

(57) ABSTRACT

A method for generating a music playlist includes: classifying a plurality of songs into first songs and second songs, the first songs being sample songs with mood vectors, and the second songs being new songs with no mood vectors; comparing physical attributes of the first songs to physical attributes of each second song; determining which first song of the first songs has physical attributes most similar to the physical attributes of each second song; assigning the mood vector of the determined first song having the most similar physical attributes to each second song; and generating a music playlist containing songs, all with mood vectors, by combining the second songs with mood vectors assigned thereto and the first songs.

8 Claims, 9 Drawing Sheets

(56) References Cited

U.S. PATENT DOCUMENTS

| | | | | |
|---|---|---|---|---|
| 2009/0063971 A1* | 3/2009 | White | ............... | G06F 3/04817 |
| | | | | 715/716 |
| 2009/0217804 A1* | 9/2009 | Lu | ..................... | G10H 1/0058 |
| | | | | 84/602 |
| 2011/0295843 A1* | 12/2011 | Ingrassia, Jr. | ..... | G06F 17/30053 |
| | | | | 707/723 |
| 2012/0233164 A1* | 9/2012 | Rowe | ............. | G06F 17/30743 |
| | | | | 707/737 |
| 2014/0031961 A1* | 1/2014 | Wansley | .......... | G06F 17/30766 |
| | | | | 700/94 |
| 2014/0067827 A1* | 3/2014 | Bilinski | ........... | G06F 17/30772 |
| | | | | 707/748 |

FOREIGN PATENT DOCUMENTS

| KR | 10-2011-0062423 A | 6/2011 |
|---|---|---|
| KR | 10-2012-0021174 A | 3/2012 |
| KR | 10-2014-0077032 A | 6/2014 |

* cited by examiner

FIG. 4

| Song ID | P1 | P2 | P3 | P4 | ... | P8 |
|---|---|---|---|---|---|---|
| | \multicolumn{4}{c}{Distance from center} | | Angle |
| Song1 | 0.5 | 0.8 | 0.7 | 0.5 | ... | 0.9 |
| Song2 | 0.7 | 0.5 | 0.4 | 0.2 | ... | 0.3 |
| ... | ... | ... | ... | ... | ... | ... |
| SongN | 0.7 | 0.5 | 0.6 | 0.7 | ... | 0.5 |

FIG. 7

| Song ID | P1 | P2 | P3 | P4 | ... | P8 |
|---|---|---|---|---|---|---|
| Song1 | 0.5 | 0.8 | 0.7 | 0.5 | ... | 0.9 |
| Song2 | 0.7 | 0.5 | 0.4 | 0.2 | ... | 0.3 |
| ... | ... | ... | ... | ... | ... | ... |
| SongN | 0.7 | 0.5 | 0.6 | 0.7 | ... | 0.5 |

FIG. 8

| Song ID | P1 | P2 | P3 | P4 | ... | P8 |
|---|---|---|---|---|---|---|
| Happy | 0.5 | 0.8 | 0.7 | 0.5 | ... | 0.9 |
| Excited | 0.7 | 0.5 | 0.4 | 0.2 | ... | 0.3 |
| ... | ... | ... | ... | ... | ... | ... |
| Sad | 0.7 | 0.5 | 0.6 | 0.7 | ... | 0.5 |

METHOD AND DEVICE FOR GENERATING MUSIC PLAYLIST

CROSS-REFERENCE TO RELATED APPLICATION

This application claims priority to and the benefit of Korean Patent Application No. 10-2014-0175826 filed in the Korean Intellectual Property Office on Dec. 9, 2014, the entire contents of which are incorporated herein by reference.

BACKGROUND OF THE DISCLOSURE

(a) Technical Field

The present disclosure relates generally to a technology related to a method for generating a music playlist, and more particularly, to a method and device for generating a music playlist which create a meta-mood model through analysis of acoustical attributes of sample songs.

(b) Description of the Related Art

The demand for technologies for finding, classifying, and suggesting audio information (i.e., music) is rapidly growing. As the volume of data storage devices has increased, technologies for finding and suggesting desired music have become necessary, particularly for storage devices containing several thousand music files.

Genre information and artist information may be available for finding music and getting music recommendations. Genres are descriptors most commonly used to classify pieces of music by form or style. The artist information allows one to find artists and get artist recommendations by classification of artists according to their similarities in musical style.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide a method and device for generating a music playlist which create a meta-mood model through analysis of acoustical attributes of sample songs and set emotional attributes of new songs by using the created meta-mood model.

Embodiments of the present disclosure provide a method for generating a music playlist, the method including: classifying a plurality of songs into first songs and second songs, the first songs being sample songs with mood vectors, and the second songs being new songs with no mood vectors; comparing physical attributes of the first songs to physical attributes of each second song; determining which first song of the first songs has physical attributes most similar to the physical attributes of each second song; assigning the mood vector of the determined first song having the most similar physical attributes to each second song; and generating a music playlist containing songs, all with mood vectors, by combining the second songs with mood vectors assigned thereto and the first songs.

The physical attributes may be mel-frequency cepstral coefficient (MFCC) vectors. The physical attributes may include at least one of: scale, average energy, rhythm, harmonics, tempo, articulation, intensity, and tonality.

The classifying of the plurality of songs may include: inputting a sound source file corresponding to a first song; analyzing the inputted sound source file; calculating physical attributes of the sound source file, including at least one of: scale, average energy, harmonics, rhythm, tempo, articulation, intensity, and tonality; normalizing each of the physical attributes to the same scale; calculating a first positional value representing a position on a mood plane where a meta-mood attribute corresponding to the mood vector of the first song is located using at least one of the normalized physical attributes; calculating a second positional value representing the position on the mood plane using at least one of the physical attributes other than those used to calculate the first positional value; and assigning the meta-mood attribute to the sound source file by positioning the sound source file with the first positional value and the second positional value on the mood plane.

The calculating of the first positional value may include: calculating a sum of scale, average energy, rhythm, and harmonics, among the normalized physical attributes; and setting the calculated sum as a distance from a center of the mood plane for the first positional value. The calculating of the second positional value may include: calculating a sum of tempo, articulation, intensity, and tonality, among the normalized physical attributes, and setting the calculated sum as an angle of rotation about an X-axis of the mood plane for the second positional value. The assigning of the meta-mood attribute may include setting the sound source file to have the meta-mood attribute by positioning the sound source file according to the distance and the angle on the mood plane.

The assigning of the mood vector of a first song may include: inputting a new sound source file corresponding to a second song of the second songs; analyzing the inputted new sound source file; calculating physical attributes of the new sound source file, including at least one of: scale, average energy, rhythm, harmonics, tempo, articulation, intensity, and tonality; normalizing each of the physical attributes to the same scale; comparing the normalized physical attributes of the new sound source file to the physical attributes of the sound source files for the first songs; and setting the mood vector of the second song based on results of the comparison.

Furthermore, according to embodiments of the present disclosure, a device for generating a music playlist includes: a receiver that receives first songs and second songs, the first songs being sample songs with mood vectors, and the second songs being new songs with no mood vectors; an analyzer that analyzes the first songs and the second songs received by the receiver, respectively, calculates physical attributes of the first songs and the second songs, and calculates mood vectors of the first songs based on the physical attributes of the first songs; a comparator that compares the physical attributes of each second song to the physical attributes of the first songs in order to determine which first song of the first songs has physical attributes most similar to physical attributes of each second song and assigns the mood vector of the determined first song to each second song; and a generator that generates a music playlist containing songs, all with mood vectors, by combining the second songs with mood vectors assigned thereto and the first songs.

The physical attributes may be mel-frequency cepstral coefficient (MFCC) vectors. The physical attributes may include at least one of: scale, average energy, rhythm, harmonics, tempo, articulation, intensity, and tonality.

The analyzer may: analyze a sound source file corresponding to a first song; calculate physical attributes of the sound source file, including at least one of: scale, average energy, harmonics, rhythm, tempo, articulation, intensity, and tonality; normalize each of the physical attributes to the same scale; calculate a first positional value representing a position on a mood plane where a meta-mood attribute corresponding to the mood vector of the first song is located using at least one of the normalized physical attributes; calculate a second positional value representing the position on the mood plane using at least one of the physical attributes other than those used to calculate the first positional value; and assign the meta-mood attribute to the sound source file by positioning the sound source file with the first positional value and the second positional value on the mood plane.

The analyzer may: calculate a sum of scale, average energy, rhythm, and harmonics, among the normalized physical attributes; set the calculated sum as a distance from a center of the mood plane where an emotional attribute corresponding to the mood vector of the first song is located for a first positional value; calculate a sum of tempo, articulation, intensity, and tonality, among the normalized physical attributes; set the calculated sum as an angle of rotation about the X-axis of the mood plane for a second positional value; and assign the emotional attribute to the sound source file by positioning the sound source file according to the distance and the angle on the mood plane.

The comparator may: analyze a new sound source file corresponding to a second song of the second songs; calculate physical attributes of the new sound source file, including at least one of: scale, average energy, harmonics, rhythm, tempo, articulation, intensity, and tonality; normalize each of the physical attributes to the same scale; compare the normalized physical attributes of the new sound source file to the physical attributes of the sound source files for the first songs; and set the mood vector of the second song based on results of the comparison.

According to the above-described embodiments of the present disclosure, a method and device for generating a music playlist allowing for fast assignment of emotional attributes to new songs by creating a meta-mood model through analysis of the acoustical attributes of sample songs and assigning emotional attributes to the new songs using the created meta-mood model are provided. Furthermore, the method and device for generating a music playlist allow for fast assignment of emotional attributes to new songs by virtue of not requiring an additional operation for calculating the mood vectors of the new songs.

BRIEF DESCRIPTION OF THE DRAWINGS

In order to more fully understand the drawings used in the detailed description of the disclosure, a brief description of the drawings is provided.

FIG. 4 is a table showing an example of sound source files that have undergone the sound source file analysis of FIG. 3.

FIG. 7 is a table showing an example of new sound source files that have undergone the sound source file analysis of FIG. 6.

FIG. 8 is a table showing an example of sound source files with representative emotional/musical attributes shown in FIG. 6.

DETAILED DESCRIPTION OF THE EMBODIMENTS

Figure 1:
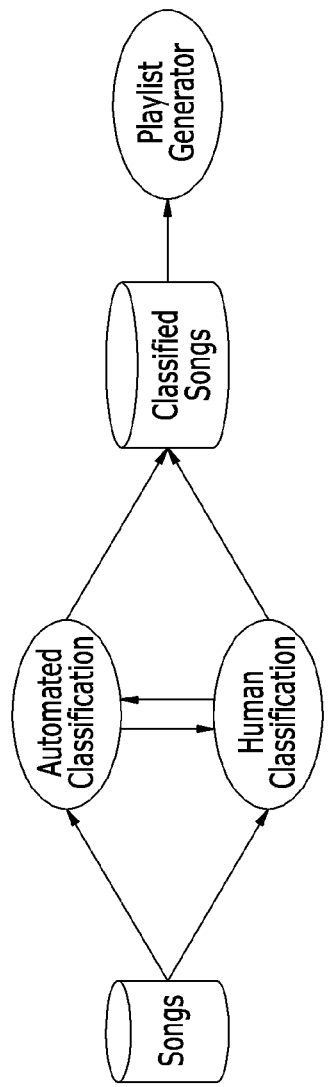
FIG. 1 is a view for explaining an example of a music data selection method.

For a better understanding of the present disclosure, and to show more clearly how it may be carried into effect, reference will now be made, by way of example, to the accompanying drawings which show embodiments of the present disclosure.

Hereinafter, embodiments of the present disclosure will be described in detail with reference to the accompanying drawings. In describing the embodiments of the present disclosure, a detailed description of pertinent known constructions or functions will be omitted if it is deemed to make the gist of the present disclosure unnecessarily vague. Wherever possible, the same reference numbers will be used throughout the drawings to refer to the same or like parts.

The terms used in the specification are used to describe only specific embodiments and are not intended to limit the present disclosure. Singular forms are intended to include plural forms unless the context clearly indicates otherwise. It will be further understood that the terms "include", "comprise", or "have" used in this specification specify the presence of stated features, steps, operations, components, parts, or a combination thereof, but do not preclude the presence or addition of one or more other features, numerals, steps, operations, components, parts, or a combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Unless indicated otherwise, it is to be understood that all the terms used in the specification including technical and scientific terms have the same meaning as those that are understood by those who are skilled in the art. It must be understood that the terms defined by the dictionary are identical with the meanings within the context of the related art, and they should not be ideally or excessively formally defined unless the context clearly dictates otherwise.

Referring now to the disclosed embodiments, one of the first things many drivers do upon starting their car is to turn on the radio or the in-car audio in order to listen to music. However, they might find it difficult to locate music they want to listen to in their car. Therefore, techniques for allowing the car user (e.g., driver or passenger) to listen to music that fits the current driving situation and suits the user's taste are needed.

In this regard, FIG. 1 is a view for explaining an example of a music data selection method. The music data selection method may be a method of selecting music data using values obtained by transforming positional coordinates. The values obtained by transforming positional coordinates may be used by an automated classification unit to classify all songs.

As shown in FIG. 1, in the music data selection method, sample songs are classified into music categories defined by an expert group through a human classification unit. In the music data selection method, the attributes of all songs are sub-classified based on the music categories defined by the expert group and stored in a database of classified songs, and then a playlist may be generated from these songs through a playlist generator.

Figure 2:
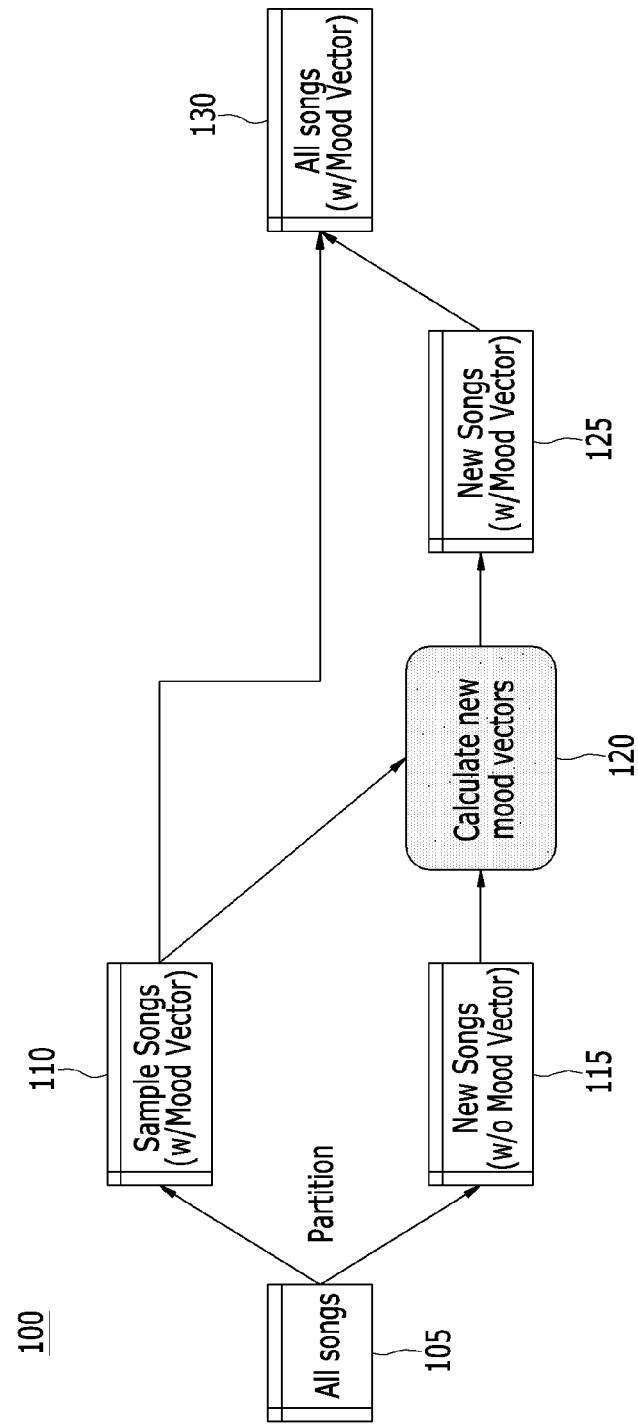
FIG. 2 is a view for explaining a method for generating a music playlist according to embodiments of the present disclosure.

FIG. 2 is a view for explaining a method for generating a music playlist according to embodiments of the present disclosure.

Figure 9:
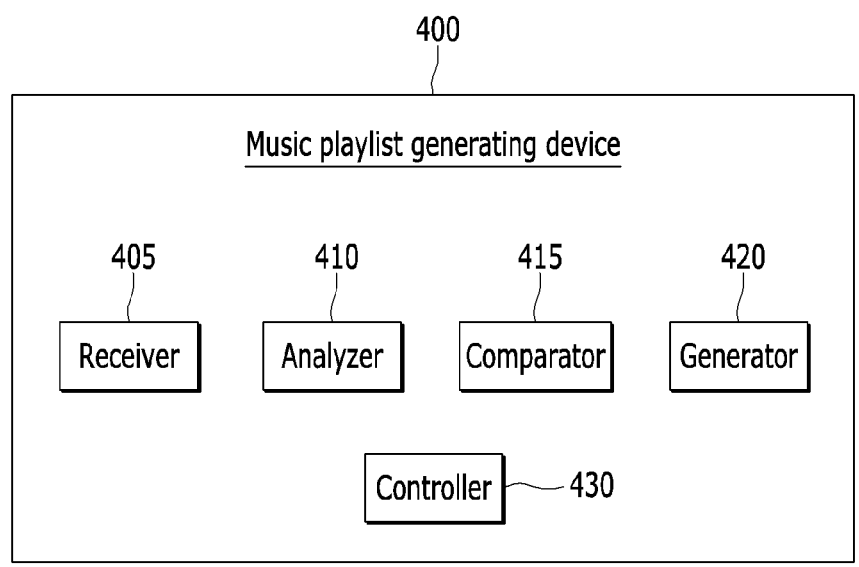
FIG. 9 is a block diagram for explaining a device for generating a music playlist according to embodiments of the present disclosure.

The music playlist generating method may be performed (i.e., executed) by a music playlist generating device 400 shown in FIG. 9, for example. The music playlist generating method 100 relates to a music recommendation service-related technology, whereby a list of music recommendations 130 for use in vehicles may be generated on an online music streaming service by using emotional attributes of music.

As shown in FIG. 2, in the music playlist generating method 100, sample songs 110, out of all songs 105, may be analyzed and classified into songs with emotional attributes (e.g., mood vectors). Thereafter, in the music playlist generating method 100, the attributes of new songs 115, out of all the songs 105 except the sample songs 110, may be physically analyzed to extract their physical features (i.e., physical attributes), and then these features may be matched with the meta-moods (or emotional attributes) of the sample songs 105 to add meta-mood data to all the songs 105. In the music playlist generating method 100, if the user (e.g., driver) selects a plurality of meta-moods, pieces of music with high significance (i.e., similarity) to the meta-moods may automatically form a playlist. This makes it possible to provide a playlist 130 corresponding to the meta-moods selected by the user. For a new song 115 with no mood vector, the mood vector of the new song 115 to be added may be determined by using the mood vector of a sample song with the highest similarity to the new song.

The music playlist generating method 100 will now be described in further detail.

All songs (i.e., all pieces of music or all sound sources) 105 may be classified into first songs and second songs. The first songs are sample songs 110 with mood vectors (or emotion vectors) assigned to them, and the second songs are new songs 115 with no mood vectors, aside from the sample songs. The classification may be performed by a controller 430 of FIG. 9.

In a new mood vector calculation step 120, the mood vector of a new song 115 may be calculated with reference to the mood vectors of the sample songs 110. More specifically, the mood vector of a first song 110 having the most similar physical attributes to those of the new song 115 may be assigned to the second song 115, as in the following equation.

$$m(n) = \text{sqrt}(\max(\text{sim}(s,n)) * m(s)) \qquad \text{[Equation]}$$

for all s in Sample Songs and a given song in New Songs

Herein, m(n) is the mood vector of a given song (n) falling into a set of new songs 115, m(s) is the mood vector of a given song (s) falling into a set of sample songs 110, and sim(s, n) is a function for calculating the similarity in physical attributes between the given song (s) falling into the set of sample songs and the given song (n) falling into the set of new songs. max indicates a function for calculating the maximum value of the similarity function, and sqrt indicates a square root function. The physical attributes may be mel-frequency cepstral coefficient (MFCC) vectors, and may include at least one of scale, average energy, rhythm, harmonics, tempo, articulation, intensity, and tonality.

The similarity between two songs, i.e., a new song 115 and a sample (i.e., first) song 110, may be calculated using MFCC vectors. MFCCs are coefficients given by a cosine transform of the power spectrum of an audio signal at each frequency on a mel-scale, which may indicate features that define the timbre of a sound source file.

Second songs 125, which are new songs with mood vectors assigned to them in the new mood vector calculation step 120, and the first songs 110 with mood vectors, may be combined together to create a music playlist 130 containing all the songs with mood vectors.

Figure 3:
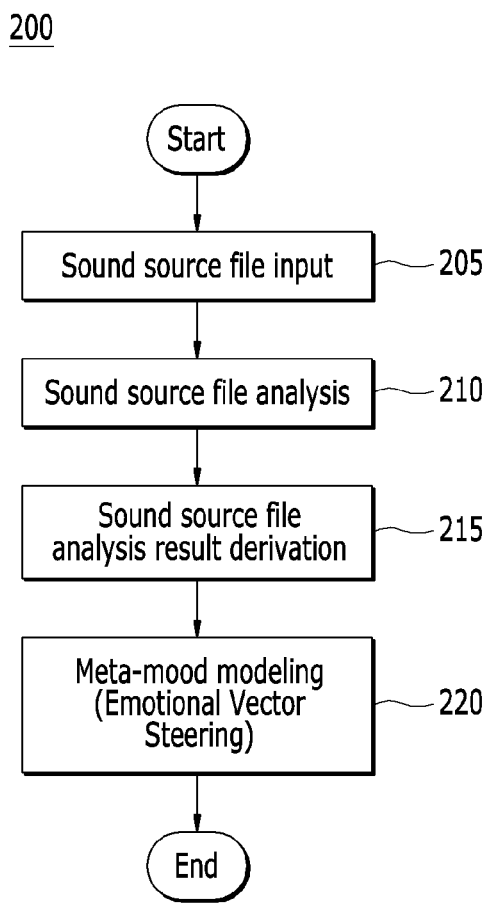
FIG. 3 is a flowchart for explaining an example of the music playlist generating method of FIG. 2.

FIG. 3 is a flowchart for explaining an example of the music playlist generating method of FIG. 2. An example of the music playlist generating method 200 may be referred to as a method for creating a meta-mood model (i.e., method for setting up data for a meta-mood model) through analysis of the acoustical attributes of pieces of music.

As shown in FIG. 3, in a sound source file input step 205, a sound source file (i.e., digital sound source data) corresponding to a first song (110 of FIG. 2) used for meta-mood analysis may be input. For example, the sound source file may be an mp3 file such as song1.mp3, song2.mp3, . . . , songN.mp3.

In a sound source file analysis step 210, the input sound source file may be analyzed to calculate (i.e., extract) eight physical attributes associated with the sound source file. For example, the eight physical attributes may include scale (or number of bits), the first physical attribute P1; average energy, the second physical attribute P2; rhythm, the third physical attribute P3; harmonics, the fourth physical attribute P4; tempo, the fifth physical attribute P5; articulation, the sixth physical attribute P5; intensity, the seventh physical attribute P7; and tonality, the eighth physical attribute P8.

In a sound source file analysis result derivation step 215, the physical attributes of the sound source file may be normalized to the same scale. An example of sound source files with physical attributes normalized to the same scale is illustrated in FIG. 4. That is, FIG. 4 illustrates a table showing an example of sound source files that have undergone the sound source file analysis of FIG. 3.

In a meta-mood modeling step 220, a vector for creating a meta-mood model may be calculated as follows.

Figure 5:
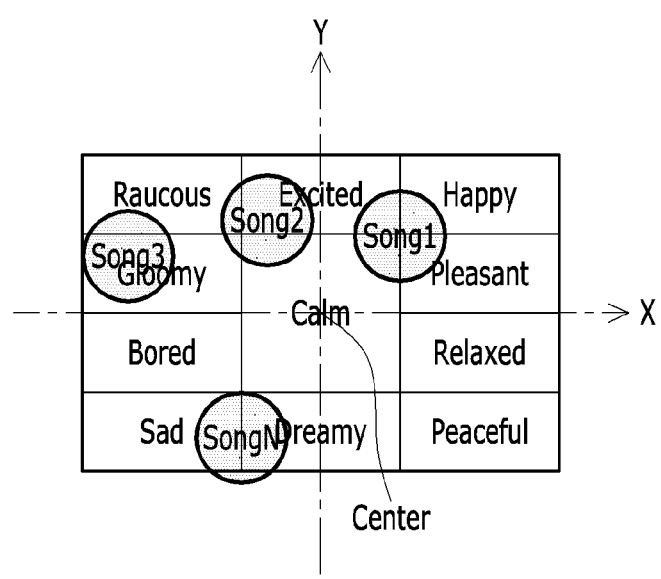
FIG. 5 is a view for explaining an example of the meta-mood modeling of FIG. 3.

The vector may consist of a distance from the center of a mood plane (i.e., meta-mood model) shown in FIG. 5 and an angle of, for example, counterclockwise rotation about the X-axis of the mood plane of FIG. 5. A distance from the center of the mood plane may be equal to the sum of the first physical attribute P1, second physical attribute P2, third physical attribute P3, and fourth physical attribute P4. An angle on the mood plane may be equal to the sum of the fifth physical attribute P5, sixth physical attribute P6, seventh physical attribute P7, and eighth physical attribute P8. Using these two components of the vector, each song (i.e., each sound source file) may have a value on the mood plane, and the corresponding attribute may be written to the metadata of each song.

Songs that are classified (or sub-classified) using different vectors for different attributes, may be categorized into groups with the same or similar attributes, as shown in FIG. 5 or FIG. 8. The definitions of different attributes on the mood plane may be changed through a test. FIG. 5 is a view for explaining an example of the meta-mood modeling of FIG. 3. The meta-mood model may be created using Thayer's two-dimensional emotion modeling technique. Thayer's emotion model may be an Arousal-Valence model.

The above-described music playlist generating method 200 will be described below in further detail.

First, a sound source file corresponding to a first song (110 of FIG. 2) may be input, and the input sound source file may analyzed to calculate the physical attributes of the sound source file, including scale, average energy, harmonics, rhythm, tempo, articulation, intensity, and tonality. All of the physical attributes may be normalized to the same scale. In another exemplary embodiment of the present disclosure, the input sound source file may be analyzed to calculate the physical attributes of the sound source file, including at least one of scale, average energy, harmonics, rhythm, tempo, articulation, intensity, and tonality.

Next, the sum of scale, average energy, rhythm, and harmonics, of the normalized physical attributes, may be calculated, and the calculated sum for a first positional value may be set as a distance from the center of the mood plane (i.e., meta-mood model) where a meta-mood attribute corresponding to the mood vector of the first song 110 is located. The sum of tempo, articulation, intensity, and tonality, out of the normalized physical attributes, may be calculated, and the calculated sum for a second positional value may be set as an angle of, for example, counterclockwise rotation about the X-axis of the mood plane. The meta-mood attribute of that piece of music may represent happy, excited, sad, etc., as shown in FIG. 5 or FIG. 8. The meta-mood attribute may be assigned (i.e., saved or mapped) to the sound source file by positioning the sound source file with the distance and the angle on the mood plane.

Additionally, in embodiments of the present disclosure, a first positional value (e.g., X coordinate value) representing (i.e., specifying) a position on the mood plane where a meta-mood attribute corresponding to the mood vector of the first song is located may be calculated by using at least one of the normalized physical attributes. A second positional value (e.g., Y-coordinate value) representing the position on the mood plane may be calculated by using at least one of the physical attributes other than (i.e., different from) those used to calculate the first positional value. The meta-mood attribute may be assigned to the sound source file by positioning the sound source file with the first positional value and the second positional value on the mood plane.

Figure 6:
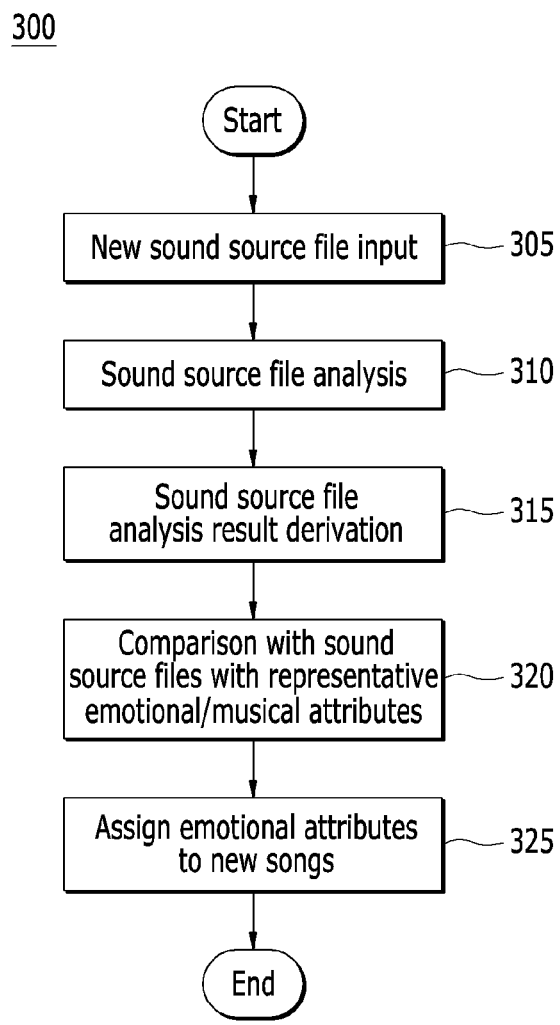
FIG. 6 is a flowchart for explaining an example of the music playlist generating method of FIG. 2.

FIG. 6 is a flowchart for explaining an example of the music playlist generating method of FIG. 2.

An example of the music playlist generating method 300 may be referred to as a method for classifying the emotional attribute of a new added song, and may be a process that is performed after the music playlist generating method explained with reference to FIG. 3 is performed. The music playlist generating method 300 may be a method that assigns an emotional attribute (mood vector) to a new song by comparing the physical attributes of the sound source file for the new song with the physical attributes (meta-mood model created by the music playlist generating method 200 of FIG. 3) of representative songs with emotional attributes.

As shown in FIG. 6, in a new sound source file input step 305, a sound source file corresponding to a second song (115 of FIG. 2) used for meta-mood analysis may be input. For example, the sound source file may be an mp3 file such as song1.mp3, song2.mp3, . . . , songN.mp3. For ease of explanation, a sound source file that has undergone the analysis that is used in the example shown in FIG. 3 may be used as the new sound source file.

In a sound source file analysis step 310, the sound source file input in the new sound source file input step 305 may be analyzed to calculate eight physical attributes associated with the sound source file. For example, the eight physical attributes may include scale (or number of bits), the first physical attribute P1; average energy, the second physical attribute P2; rhythm, the third physical attribute P3; harmonics, the fourth physical attribute P4; tempo, the fifth physical attribute P5; articulation, the sixth physical attribute P5; intensity, the seventh physical attribute P7; and tonality, the eighth physical attribute P8.

In a sound source file analysis result derivation step 315, the physical attributes of the new sound source file may be normalized to the same scale. An example of new sound source files with physical attributes normalized to the same scale is illustrated in FIG. 7. That is, FIG. 7 is a table showing an example of new sound source files that have undergone the sound source file analysis of FIG. 6.

In a comparison step 320, the new sound source file that has undergone the sound source file analysis may be compared with an example of sound source files with representative emotional/musical attributes shown in FIG. 8 (the meta-mood model created by the music playlist generating method of FIG. 3). More specifically, the normalized physical attributes of the new sound source file may be compared with the physical attributes of sound source files with representative emotional attributes.

In an emotional attribute assigning step 325, the representative emotional/musical attribute of a representative sound source file, which is identified as having the most similar physical attributes to those of a particular new sound source file, as a result of the comparison step 320, may be assigned (i.e., saved) as the emotional attribute of the particular new sound source file. The music playlist generating method 300 may be easily used in an embedding environment by virtue of not requiring an additional operation for calculating mood vectors.

The above-described music playlist generating method 300 will be described below in further detail.

First, a new sound source file corresponding to a second song (115 of FIG. 2) may be input, and the input new sound source file may be analyzed to calculate the physical attributes of the sound source file, including scale, average energy, harmonics, rhythm, tempo, articulation, intensity, and tonality. In another exemplary embodiment of the present disclosure, the input new sound source file may be analyzed to calculate the physical attributes of the sound source file, including at least one of scale, average energy, harmonics, rhythm, tempo, articulation, intensity, and tonality.

Next, all of the physical attributes may be normalized to the same scale. The normalized physical attributes of the new sound source file may be compared with the physical attributes of the sound source files for the first songs 110. According to the result of the comparison, the mood vector of a first song 110 having the most similar physical attributes to those of the second song 115 may be assigned to the second song 115.

The above-described method for generating (i.e., providing) a music playlist through analysis of emotional attributes of music according to embodiments of the present disclosure will be described again below.

Firstly, meta-mood data (i.e., emotional attribute data) with mood vectors calculated based on eight physical attributes may be assigned to sample songs through a detailed analysis of the physical attributes of the sample songs.

Next, the physical attributes of all the other sound sources (i.e., new sound sources) except the sample songs may be analyzed to perform similarity analysis of the new sound sources and the sample songs with mood vectors.

Next, the mood vector having the highest correlation (i.e., similarity) with a new song may be added (i.e., assigned) to the new song through an analysis of correlation between the new song and the sample songs with mood vectors. Accordingly, new songs that can be added to a playlist may have emotional attributes by comparison with the sample songs.

Once new songs are added through the above-described method, emotional attributes may be quickly assigned to the new songs through MFCC analysis, which is a type of similarity comparison of pieces of music that allows for fast analysis.

FIG. 9 is a block diagram for explaining a device for generating a music playlist according to embodiments of the present disclosure.

As shown in FIG. 9, the music playlist generating device 400 may include a receiver 405, an analyzer 410, a comparator 415, a generator 420, and a controller 430.

The music playlist generating device 400 may be mounted in a vehicle. In this case, the music playlist generating device 400 may be referred to as a vehicle audio playback system.

The receiver 405 may receive first songs, which are sample songs, and second songs, which are new songs.

The analyzer 410 may analyze the first songs and second songs received by the receiver 405, respectively (i.e., by audio signal processing of the first songs and second songs), to calculate (i.e., extract) their physical attributes and calculate the mood vectors of the first songs using the physical attributes of the first songs. These physical attributes may be MFCC vectors, and may include at least one of scale, average energy, rhythm, harmonics, tempo, articulation, intensity, and tonality.

The comparator 415 may compare the physical attributes of each second song with the physical attributes of the first songs to find a first song having the most similar physical attributes to those of each second song and assign the mood vector of the found first song to each second song. For example, when the difference between the physical attributes of a second song and the physical attributes of a first song is minimal, the physical attributes of the second song and the physical attributes of the first song may be most similar to each other.

The generator 420 may generate a music playlist by combining the first songs with calculated mood vectors and the second songs with mood vectors assigned to them together.

The analyzer 410 may analyze a sound source file corresponding to a first song to calculate the physical attributes of the sound source file, including scale, average energy, harmonics, rhythm, tempo, articulation, intensity, and tonality, normalize all of the physical attributes to the same scale, calculate the sum of scale, average energy, rhythm, and harmonics, out of the normalized physical attributes, and set the calculated sum for a first positional value as a distance from the center of the mood plane where an emotional attribute (i.e., meta-mood attribute) corresponding to the mood vector of the first song is located, calculate the sum of tempo, articulation, intensity, and tonality, out of the normalized physical attributes, and set the calculated sum for a second positional value as an angle of, for example, counterclockwise rotation about the X-axis of the mood plane, and assign the emotional attribute (i.e., meta-mood attribute) to the sound source file by positioning the sound source file with the distance and the angle on the mood plane.

Additionally, in embodiments of the present disclosure, the analyzer 410 may analyze a sound source file corresponding to a first song to calculate the physical attributes of the sound source file, including at least one of scale, average energy, harmonics, rhythm, tempo, articulation, intensity, and tonality, normalize all of the physical attributes to the same scale, calculate a first positional value representing a position on the mood plane where a meta-mood attribute corresponding to the mood vector of the first song is located, by using at least one of the normalized physical attributes, calculate a second positional value representing the position on the mood plane, by using at least one of the physical attributes other than those used to calculate the first positional value, and assign the meta-mood attribute to the sound source file by positioning the sound source file with the first positional value and the second positional value on the mood plane.

The comparator 415 may analyze a new sound source file corresponding to a second song to calculate the physical attributes of the sound source file, including scale, average energy, harmonics, rhythm, tempo, articulation, intensity, and tonality, normalize all of the physical attributes to the same scale, and compare the normalized physical attributes of the new sound source file with the physical attributes of the sound source files for the first songs to set the mood vector of the second song.

Furthermore, in embodiments of the present disclosure, the comparator 415 may analyze a new sound source file corresponding to a second song to calculate the physical attributes of the sound source file, including at least one of scale, average energy, harmonics, rhythm, tempo, articulation, intensity, and tonality, normalize all of the physical attributes to the same scale, and compare the normalized physical attributes of the new sound source file with the physical attributes of the sound source files for the first songs to set the mood vector of the second song.

The controller 430 may perform the functions of a central processing unit (CPU) (or processor), and control the overall operations of the receiver 410, comparator 415, and generator 420. The controller 430 may include a program containing a series of commands for performing the music playlist generating method of this disclosure.

The components, units, blocks, or modules used in the present exemplary embodiment may be implemented by software components, such as tasks, classes, subroutines, processes, objects, execution threads, or programs, or by hardware components, such as Field Programmable Gate Array (FPGA) or Application Specific Integrated Circuit (ASIC), or by combinations of the software and hardware components. The components may be included in a computer-readable storage medium, or some of the components may be distributed in a plurality of computers.

As described above, embodiments have been disclosed in the drawings and the specification. Although the specific terms have been used herein, they have been used merely for the purpose of describing the present disclosure, and have not been used to limit the meanings thereof and the scope of the present disclosure set forth in the claims. Therefore, it will be understood by those having ordinary knowledge in the art that various modifications and other embodiments can be made. Accordingly, the true technical protection range of this disclosure should be defined by the technical spirit of the attached claims.

DESCRIPTION OF SYMBOLS

210: sound source file analysis step
215: sound source file analysis result derivation step
220: meta-mood modeling step
310: sound source file analysis step
315: sound source file analysis result derivation step
320: comparison step
410: analyzer
415: comparator

What is claimed is:

1. A method for generating a music playlist, the method comprising:
classifying a plurality of songs into first songs and second songs, the first songs being sample songs with mood vectors, and the second songs being new songs with no mood vectors;
comparing physical attributes of the first songs to physical attributes of each second song; determining which first song of the first songs has physical attributes most similar to the physical attributes of each second song;
assigning the mood vector of the determined first song having the most similar physical attributes to each second song; and
generating a music playlist containing songs, all with mood vectors, by combining the second songs with mood vectors assigned thereto and the first songs,
wherein the classifying of the plurality of songs comprises:
inputting a sound source file corresponding to a first song;
analyzing the inputted sound source file;
calculating physical attributes of the sound source file, including at least one of: scale, average energy, harmonics, rhythm, tempo, articulation, intensity, and tonality;
normalizing each of the physical attributes to the same scale;
calculating a first positional value representing a position on a mood plane including a plurality of moods where a meta-mood attribute corresponding to the mood vector of the first song is located using at least one of the normalized physical attributes;
calculating a second positional value representing the position on the mood plane using at least one of the physical attributes other than those used to calculate the first positional value; and
assigning the meta-mood attribute to the sound source file by positioning the sound source file with the first positional value and the second positional value on the mood plane.

2. The method of claim 1, wherein the physical attributes are mel-frequency cepstral coefficient (MFCC) vectors.

3. The method of claim 1, wherein:
the calculating of the first positional value comprises:
calculating a sum of scale, average energy, rhythm, and harmonics, among the normalized physical attributes; and
setting the calculated sum as a distance from a center of the mood plane for the first positional value,
the calculating of the second positional value comprises:
calculating a sum of tempo, articulation, intensity, and tonality, among the normalized physical attributes, and
setting the calculated sum as an angle of rotation about an X-axis of the mood plane for the second positional value, and
the assigning of the meta-mood attribute comprises:
assigning the meta-mood attribute to the sound source file by positioning the sound source file according to the distance and the angle on the mood plane.

4. The method of claim 3, wherein the assigning of the mood vector of the first song comprises:
inputting a new sound source file corresponding to a second song of the second songs;
analyzing the inputted new sound source file;
calculating physical attributes of the new sound source file, including at least one of: scale, average energy, rhythm, harmonics, tempo, articulation, intensity, and tonality;
normalizing each of the physical attributes to the same scale;
comparing the normalized physical attributes of the new sound source file to the physical attributes of the sound source files for the first songs; and
setting the mood vector of the second song based on results of the comparison.

5. A device for generating a music playlist, the device comprising:
a controller including a memory configured to store program instructions and a processor configured to execute the stored program instructions, wherein the controller controls operation of:
a receiver that receives first songs and second songs, the first songs being sample songs with mood vectors, and the second songs being new songs with no mood vectors;
an analyzer that analyzes the first songs and the second songs received by the receiver, respectively, calculates physical attributes of the first songs and the second songs, and calculates mood vectors of the first songs based on the physical attributes of the first songs;
a comparator that compares the physical attributes of each second song to the physical attributes of the first songs in order to determine which first song of the first songs has physical attributes most similar to physical attributes of each second song and assigns the mood vector of the determined first song to each second song; and a generator that generates a music playlist containing songs, all with mood vectors, by combining the second songs with mood vectors assigned thereto and the first songs, wherein the analyzer:

analyzes a sound source file corresponding to a first song;

calculates physical attributes of the sound source file, including at least one of: scale, average energy, harmonics, rhythm, tempo, articulation, intensity, and tonality;

normalizes each of the physical attributes to the same scale;

calculates a first positional value representing a position on a mood plane including a plurality of moods where a meta-mood attribute corresponding to the mood vector of the first song is located using at least one of the normalized physical attributes;

calculates a second positional value representing the position on the mood plane using at least one of the physical attributes other than those used to calculate the first positional value; and assigns the meta-mood attribute to the sound source file by positioning the sound source file with the first positional value and the second positional value on the mood plane.

6. The device of claim 5, wherein the physical attributes are mel-frequency cepstral coefficient (MFCC) vectors.

7. The device of claim 5, wherein the analyzer:

calculates a sum of scale, average energy, rhythm, and harmonics, among the normalized physical attributes;

sets the calculated sum as a distance from a center of the mood plane where an emotional attribute corresponding to the mood vector of the first song is located for a first positional value;

calculates a sum of tempo, articulation, intensity, and tonality, among the normalized physical attributes;

sets the calculated sum as an angle of rotation about the X-axis of the mood plane for a second positional value; and assigns the emotional attribute to the sound source file by positioning the sound source file according to the distance and the angle on the mood plane.

8. The device of claim 7, wherein the comparator:

analyzes a new sound source file corresponding to a second song of the second songs;

calculates physical attributes of the new sound source file, including at least one of: scale, average energy, harmonics, rhythm, tempo, articulation, intensity, and tonality;

normalizes each of the physical attributes to the same scale;

compares the normalized physical attributes of the new sound source file to the physical attributes of the sound source files for the first songs; and sets the mood vector of the second song based on results of the comparison.

* * * * *